(12) United States Patent
Abe et al.

(10) Patent No.: US 12,549,052 B2
(45) Date of Patent: Feb. 10, 2026

(54) COIL WIRE MODULE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Tomoki Abe, Yokkaichi (JP); Daisuke Hashimoto, Yokkaichi (JP); Masaharu Suetani, Yokkaichi (JP); Kentaro Tachi, Yokkaichi (JP); Yasushi Tamura, Osaka (JP); Kanzo Ishihara, Osaka (JP); Shintaro Morino, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 182 days.

(21) Appl. No.: 18/574,949

(22) PCT Filed: Jun. 13, 2022

(86) PCT No.: PCT/JP2022/023605
§ 371 (c)(1),
(2) Date: Dec. 28, 2023

(87) PCT Pub. No.: WO2023/276631
PCT Pub. Date: Jan. 5, 2023

(65) Prior Publication Data
US 2024/0313602 A1  Sep. 19, 2024

(30) Foreign Application Priority Data
Jul. 1, 2021 (JP) .................... 2021-109962

(51) Int. Cl.
*H02K 3/50* (2006.01)
*H02K 3/04* (2006.01)
*H02K 5/22* (2006.01)

(52) U.S. Cl.
CPC .................. *H02K 3/50* (2013.01); *H02K 3/04* (2013.01); *H02K 5/225* (2013.01)

(58) Field of Classification Search
CPC ............ H02K 5/225; H02K 3/50; H02K 3/52; H02K 3/04; H02K 3/522; H02K 3/521; H02K 3/38
(Continued)

(56) References Cited

U.S. PATENT DOCUMENTS

2008/0136274 A1  6/2008  Fujii et al.
2017/0331342 A1* 11/2017  Beetz ................... H01R 4/2429

FOREIGN PATENT DOCUMENTS

JP  2014090532 A  *  5/2014
JP  2017162591 A  *  9/2017

OTHER PUBLICATIONS

Aneha Misa, Clip for Wiring Connection and Stator, Sep. 14, 2017, JP 2017162591 (English Machine Translation) (Year: 2017).*
(Continued)

*Primary Examiner* — Alexander A Singh
(74) *Attorney, Agent, or Firm* — Oliff PLC

(57) ABSTRACT

A coil wire module for a rotating electric machine, the core wire module including: a plurality of coil wires that are configured to be provided in a core of the rotating electric machine; and a clip having a pair of elastic pieces, wherein: the plurality of coil wires each have a connection end that is configured to be exposed from an end of the core, the clip is elastically deformable in a manner that changes a width of the pair of elastic pieces, and in a state where the pair of elastic pieces pinch together at least two of the connection
(Continued)

ends of the plurality of coil wires, the at least two of the connection ends are kept in contact with each other by an elastic force of the clip.

9 Claims, 6 Drawing Sheets

(58) Field of Classification Search
USPC .......................................................... 310/71
See application file for complete search history.

(56) References Cited

OTHER PUBLICATIONS

Kono Michihisa, Stator for Dynamo-Electric Machine, May 15, 2014, JP 2014090532 (English Machine Translation) (Year: 2014).*
Aug. 30, 2022 International Search Report issued in International Patent Application No. PCT/JP2022/023605.

* cited by examiner

COIL WIRE MODULE

BACKGROUND

The present disclosure relates to a coil wire module.

JP 2008-148479A discloses TIG (Tungsten Inert Gas) welding a busbar and a rectangular conducting wire with a connection end portion of the rectangular conducting wire inserted into a notch formed in the busbar. A plurality of rectangular conducting wires of an armature are thereby connected to each other via busbars.

SUMMARY

According to the technology disclosed in JP 2008-148479A, the joining end portion of the rectangular conducting wires is inserted into the notch of the busbars, and the busbars and the rectangular conducting wires are then TIG welded, thus making the task of connecting the rectangular conducting wires to each other complex.

An exemplary aspect of the disclosure facilitates connection between coil wires.

A coil wire module of the present disclosure is a coil wire module for a rotating electric machine, including a plurality of coil wires that are configured to be provided in a core of the rotating electric machine; and a clip having a pair of elastic pieces, wherein: the plurality of coil wires each have a connection end that is configured to be exposed from an end of the core, the clip is elastically deformable in a manner that changes a width of the pair of elastic pieces, and in a state where the pair of elastic pieces pinch together at least two of the connection ends of the plurality of coil wires, the at least two of the connection ends are kept in contact with each other by an elastic force of the clip.

According to the present disclosure, connection between coil wires is facilitated.

DETAILED DESCRIPTION OF EMBODIMENTS

Description of Embodiments of Disclosure

Figure 1:
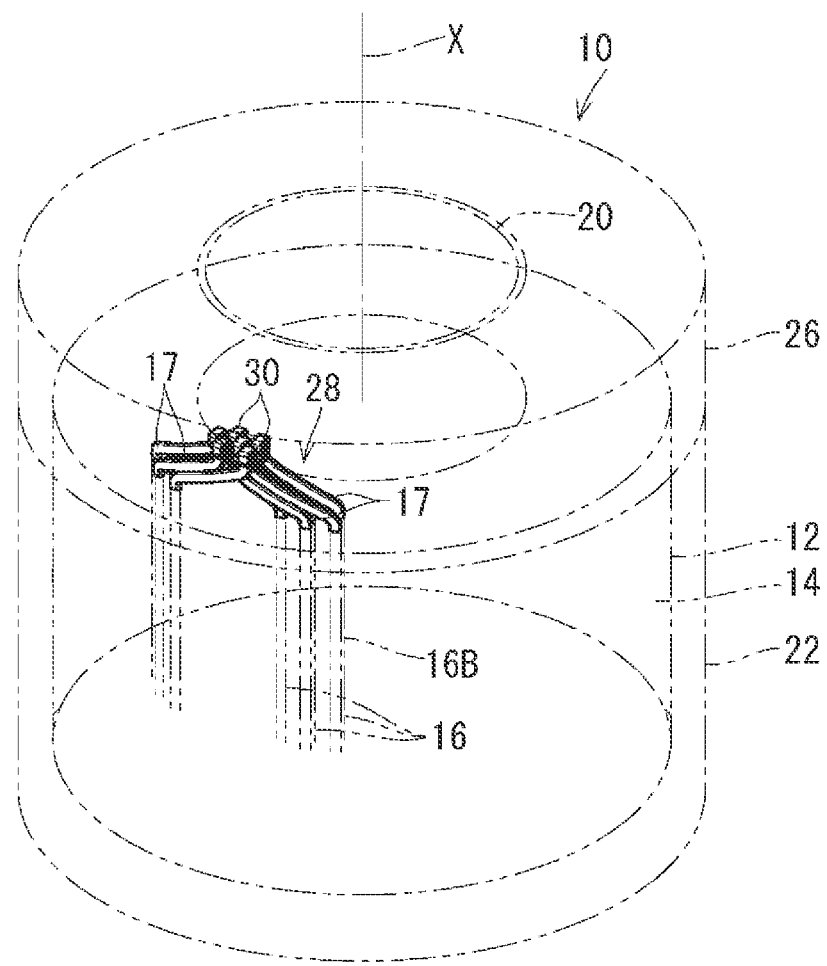
FIG. 1 is a schematic perspective view showing a motor according to Embodiment 1.

Initially, modes of the present disclosure will be enumerated and described.

A coil wire module of the present disclosure is as follows.

(1) A coil wire module for a rotating electric machine, including a plurality of coil wires that are provided in a core of the rotating electric machine, and a clip having a pair of elastic pieces, the plurality of coil wires each having a connection end portion that is exposed from an end portion of the core, the clip being elastically deformable in a manner that changes a width of the pair of elastic pieces, and, in a state where the pair of elastic pieces pinch together at least two of the connection end portions of the plurality of coil wires, the at least two connection end portions being kept in contact with each other by an elastic force of the clip.

With this coil wire module, if at least two connection end portions are pinched together by the pair of elastic pieces of the clip, the at least two connection end portions can be kept in contact with each other. Connection between the coil wires is thus facilitated.

(2) In the coil wire module of (1), the clip may include a first clip and a second clip located on an inner peripheral side with respect to the first clip, and the first clip and the second clip may be located at different positions in a circumferential direction of the core. The first clip and the second clip are located at different positions in the radial and circumferential directions of the core, and can thus be disposed as close together as possible while avoiding interfering with each other.

(3) In the coil wire module of (2), the clip may include a third clip located on an inner peripheral side with respect to the second clip, and the third clip may be located at a same position to the first clip and at a different position to the second clip in the circumferential direction of the core. In this case, the first clip, the second clip and the third clip can be disposed as close together as possible while avoiding interfering with each other.

(4) In the coil wire module of (1), the pair of elastic pieces may pinch together a plurality of sets of the at least two connection end portions. In this way, by pinching together a plurality of sets of at least two connection end portions with the clip, simplification of the configuration is achieved, as compared with the case where each set is pinched together with a separate clip.

(5) The coil wire module of (4) may further include an insulating member insulating the sets of at least two connection end portions from each other. Sets of at least two connection end portions can thereby be electrically connected individually while being insulated from each other.

(6) In the coil wire module according to any one of (1) to (5), the connection end portions may extend in a direction not parallel to a rotation axis of the rotating electric machine, and the pair of elastic pieces may pinch together end portions of the portions of the connection end portions extending in the direction not parallel to the rotation axis of the rotating electric machine. In this case, due to the pair of elastic pieces pinching together the end portions of the portions of the connection end portions that extends in a direction not parallel to the rotation axis of the rotating electric machine, the connection end portions no longer need to be provided with a portion parallel to the rotation axis of the rotating electric machine. The protruding length of the end portion of the coil wires can thereby be reduced in the rotation axis direction, enabling the coil wire module to be miniaturized.

(7) The coil wire module according to any one of (1) to (6) may include a plurality of the clip, and a coupling portion coupling the plurality of clips together, such that the plurality of clips are lined up at an interval from each other in the circumferential direction of the core. Connection between the coil wires at a large number of places is thereby facilitated by the plurality of clips.

(8) In the coil wire module of (7), the coupling portion may be a portion bent from a straight shape. In this case, a plurality of clips can be lined up in the circumferential direction of the core, by performing a pressing process or the like such that the plurality of clips are linked together in a straight line and thereafter bending the coupling portion. A plurality of clips can thereby be easily processed and yield is enhanced.

Detailed Description of Embodiments of Disclosure

Specific examples of a coil wire module in a rotating electric machine of the present disclosure will be described below with reference to the drawings. Note that the present disclosure is not limited to these illustrative examples and is defined by the claims, and all changes that come within the meaning and range of equivalency of the claims are intended to be embraced therein.

Embodiment 1

Hereinafter, a coil wire module in a rotating electric machine according to Embodiment 1 will be described. The coil wire module in the rotating electric machine is a portion in which coil wires of the rotating electric machine are connected to each other. For convenience of description, the overall configuration of a motor 10, which is an example of the rotating electric machine, will be described. FIG. 1 is a schematic perspective view showing the motor 10.

The motor 10 is provided with a stator 12 and a rotor 20. The motor 10 is, for example, a three-phase motor. In the present embodiment, the rotor 20 is configured to rotate about a rotation axis X inside the stator 12. The rotating electric machine may be a generator instead of an electric motor such as the motor 10.

The stator 12 is an armature and is provided with a stator core 14 and a plurality of coil wires 16. The stator core 14 includes a plurality of teeth. The plurality of teeth are provided so as to surround the rotation axis X. Gaps are provided between the teeth around the rotation axis X.

The plurality of coil wires 16 are provided in the stator core 14. The coil wires 16 each include a straight portion 16B disposed between the teeth so as to extend in a direction parallel to the rotation axis X, and a connection end portion 17 (connection end) exposed from an end portion of the stator core 14. At least two connection end portions 17 are connected to each other on the outer side of the stator core 14 in the axial direction, so as to form a coil having one or more teeth as a core. FIG. 1 shows a plurality of sets of two connection end portions 17 connected to each other upward of the stator core 14. At least two connection end portions may also be connected to each other downward of the stator core 14 in FIG. 1. The at least two coil wires 16 on the outer side of either end of the stator core 14 need not be connected by the same configuration. For example, downward of the stator core 14, two coil wires may be directly joined by being integrally formed. Also, downward of the stator core 14, two coil wires may be connected via a busbar or the like formed by a metal plate or the like.

Due to a plurality of coil wires 16 being connected in predetermined sets on one end side and the other end side of the stator core 14, a coil that produces a magnetic field for rotating the rotor 20 can be produced. The coil wires 16 that are provided in the stator 12 may be wound using a distributed winding method or a concentrated winding method.

The rotor 20 includes a permanent magnet and is provided in a rotatable manner inside the stator 12. Due to the magnetic field that is produced by the stator 12, the rotor 20 rotates about the rotation axis X.

A main body case 22 is provided so as to surround the periphery and other end side of the stator 12. Also, a cover 26 is provided so as to cover the one end side of the stator 12.

Note that the end portions of some of the plurality of coil wires 16 are lead out of the one end portion of the stator 12 and used as end portions to be connected to an external power source. Also, the end portions of the remaining coil wires 16 are lead out of the one end portion of the stator 12 and used as end portions for connecting at a neutral point.

Figure 2:
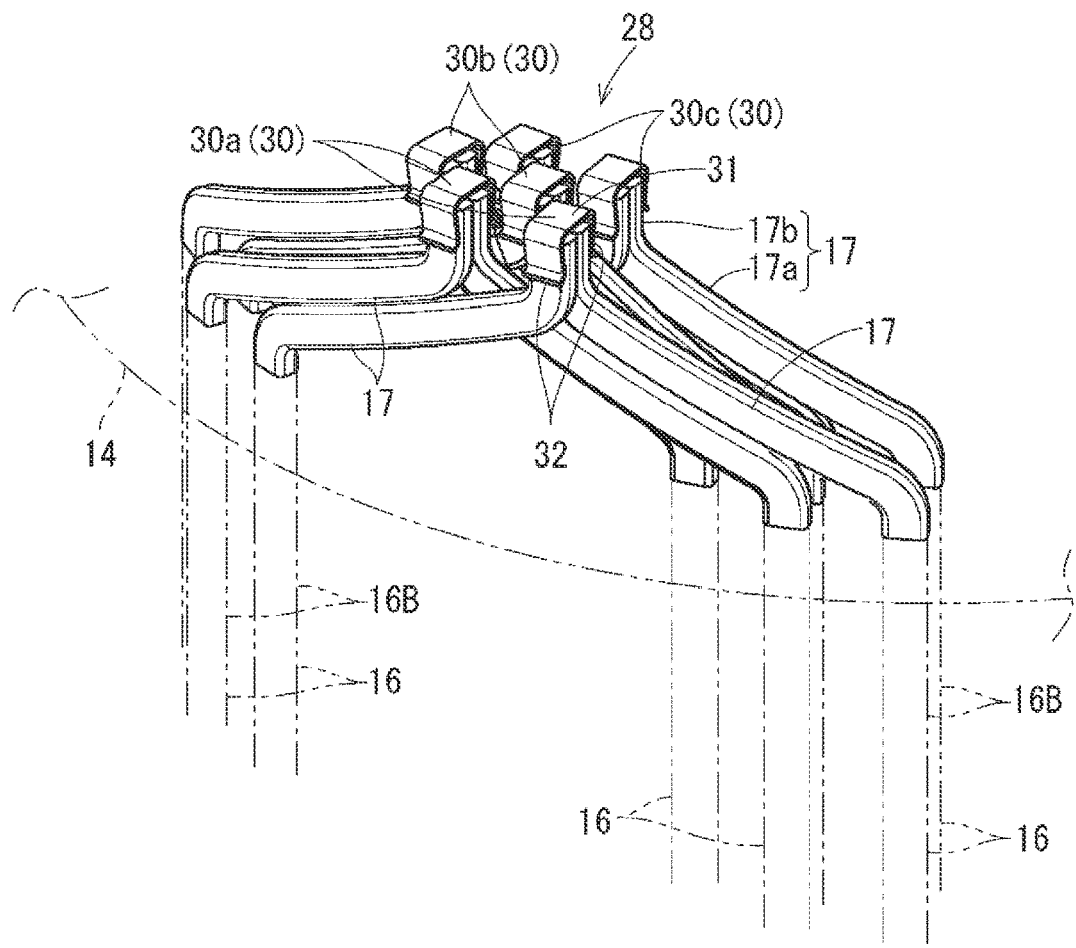
FIG. 2 is a perspective view showing connection portions between two connection end portions.
Figure 3:
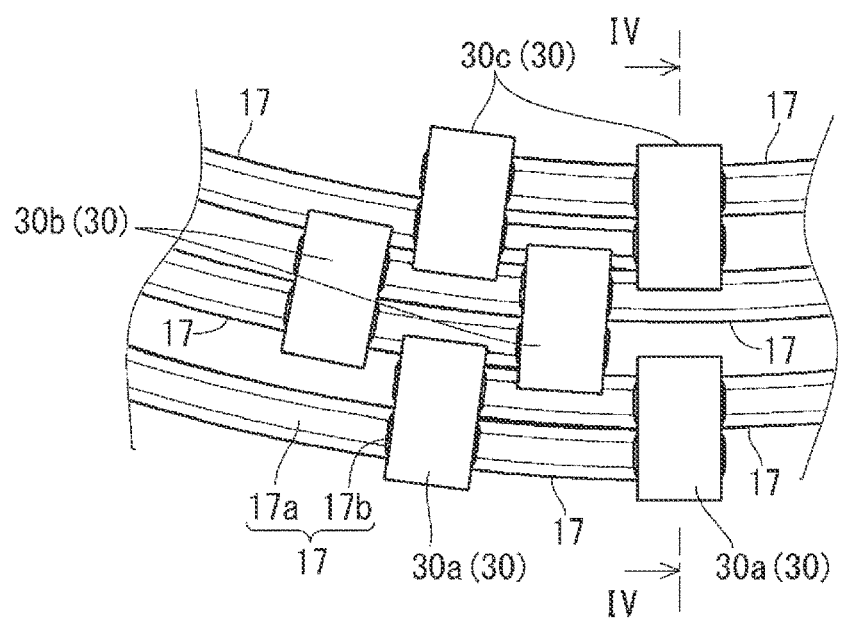
FIG. 3 is a plan view of the connection portions shown in FIG. 2 as seen along a rotation axis X.
Figure 4:
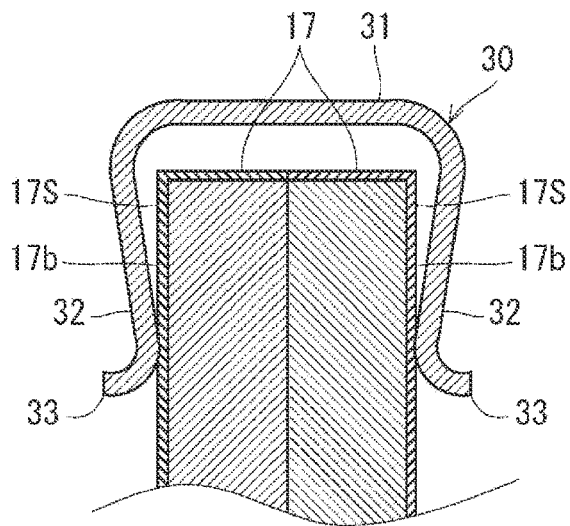
FIG. 4 is a partial cross-sectional view taken along line IV-IV in FIG. 3.

A coil wire module 28 in the rotating electric machine will now be described more specifically, focusing on the configuration for connecting two connection end portions 17. FIG. 2 is a perspective view showing connection portions between two connection end portions 17. FIG. 2 selectively depicts six sets of connection portions. FIG. 3 is a plan view of the connection portions shown in FIG. 2 as seen along the rotation axis X. FIG. 4 is a partial cross-sectional view taken along line IV-IV in FIG. 3.

The coil wire module 28 in the rotating electric machine is provided with the plurality of coil wires 16 and a clip 30.

The coil wires 16 are each formed by, for example, a rectangular conductor whose transverse section (cross section of a plane orthogonal to the extension direction) is rectangular in shape. The corners may be rounded. The coil wires 16 are made of a metal such as copper or a copper alloy. The coil wires 16 each include the straight portion 16B and the connection end portion 17. The straight portion 16B is disposed in a slot between the teeth in the stator core 14. The straight portion 16B is formed to extend straight in the rotation axis X direction.

The connection end portion 17 is exposed from an end portion of the stator core 14 and extends toward another connection end portion 17 to be connected to. In the present embodiment, coil wires 16 at different positions in the circumferential direction of a circle centered on the rotation axis X are connected to each other. Thus, the connection end portion 17 of one of the two coil wires 16 that are connected to each other includes an inclined portion 17a that proceeds closer to the other coil wire 16 to be connected to in the circumferential direction as it extends further from the end portion of the stator core 14. The inclined portion 17a extends in a direction not parallel to the rotation axis X. A straight end portion 17b that extends toward the opposite side to the stator core 14 in the rotation axis X direction is provided at the distal end portion of the inclined portion 17a. Also, the connection end portion 17 of the other coil wire 16 of the two coil wires 16 that are connected to each other includes an inclined portion 17a that proceeds closer to the one coil wire 16 to be connected to in the circumferential direction as it extends further from the end portion of the stator core 14. A straight end portion 17b that extends toward the opposite side to the stator core 14 in the rotation axis X direction is provided at the distal end portion of the inclined portion 17a. The distal end portions of the inclined portions 17a and the straight end portions 17b of two coil wires 16 that are connected to each other are disposed at an intermediate (here, middle) position between the two coil wires 16 in the circumferential direction. Also, the distal end portions of the inclined portions 17a and the straight end portions 17b of the two coil wires 16 can respectively be arranged side by side in the radial direction of a circle centered on the rotation axis X. Note that the longitudinal direction of the transverse section of the coil wires 16 may be in a direction tangential to the circumferential direction. In this case, the contact area between the distal end portions of the inclined portions 17a and between the straight end portions 17b is large.

An insulating coating made of enamel or the like may be formed on the outer periphery of the straight portion 16B. The conductor of the portion of the connection end portion 17 that contacts the other connection end portion 17 is exposed. FIG. 4 shows the conductors exposed on the contacting surfaces of the connection end portions 17 that are connected to each other, and an insulating coating 17S formed on the other surfaces.

For example, an insulating coating made of enamel or the like may be formed over the entirely of the coil wire 16, and the insulating coating may be removed from only the surface of the connection end portion 17 that contacts the other connection end portion 17. The insulating coating of the entire periphery of the connection end portion 17 may also be removed, and an insulating coating may then be formed by powder coating or the like on surfaces other than the surface that contacts the other connection end portion 17. The insulating coating may, of course, be removed from the entire outer periphery of the connection end portion 17 and the conductor may be left exposed.

The clip 30 is formed with a material having elasticity such as spring steel or resin. The clip 30 includes a base portion 31 and a pair of elastic pieces 32. The base portion 31 is formed in a plate shape. The pair of elastic pieces 32 are formed in a plate shape extending on one main surface side of the base portion 31 from both side edges of the base portion 31. The pair of elastic pieces 32 include portions that proceed further in a direction approaching each other as the distance from the base portion 31 increases. The distal end portions of the pair of elastic pieces 32 include distal end guide portions 33 that proceed further in a direction away from each other as the distance from the base portion 31 increases. In an initial shape, the interval between the narrowest portions of the pair of elastic pieces 32 is set smaller than the thickness of two connection end portions 17 arranged side by side. The interval between the most distal end portions of the distal end guide portions 33 may be set larger than the thickness of the two connection end portions 17 arranged side by side. The clip 30 is configured to be elastically deformable in a manner that changes the width between of the pair of elastic pieces 32. When the width between the pair of elastic pieces 32 is widened to more than the width in the initial shape, the pair of the elastic pieces 32 are biased in a direction approaching each other, due to the elastic force of the clip 30 itself, in particular, the elastic force exhibited by the portion from the base portion 31 to the elastic pieces 32.

Then, with the two straight end portions 17b arranged side by side, the pair of elastic pieces 32 are spread apart, and the two straight end portions 17b are pinched together between the pair of elastic pieces 32. Note that the pair of elastic pieces 32 may be spread apart, by pressing the clip 30 toward the straight end portions 17b arranged side by side, with the inward surfaces of the pair of distal end guide portions 33 pressed against the outward surfaces of the straight end portions 17b arranged side by side. Then, with the pair of elastic pieces 32 disposed on the outward surfaces of the straight end portions 17b arranged side by side, the pair of elastic pieces 32 are biased in a direction approaching each other by the elastic force acting to return the clip 30 to its original shape. The pair of elastic pieces 32 thereby push the two straight end portions 17b in a direction approaching each other and keep the two connection end portions 17 in contact with each other.

In the present embodiment, since the clip 30 is pushed in the rotation axis X direction, the base portion 31 is disposed on the distal end faces of the straight end portions 17b. The base portion 31 may also be disposed on the lateral portion side of the straight end portions 17b.

Two connection end portions 17 may be connected by a clip 30 at a plurality of locations in the circumferential direction of the stator core 14. In this case, a plurality of clips 30 are lined up at an interval from each other in the circumferential direction of the stator core 14. Also, two connection end portions 17 may be connected by a clip 30 at different positions in the radial direction of the stator core 14. In this case, a plurality of clips 30 are disposed along a plurality of circumferential paths having different diameters.

In such a case, the circumferential positions of the clips 30 may be shifted as appropriate, such that the clips do not interfere with each other between the circumferential paths. The clips 30 are thereby easily disposed close together while avoiding interference between the clips 30.

That is, the clips 30 are separated into a first clip 30a, a second clip 30b and a third clip 30c. Hereinafter, if necessary, the clips 30 will be distinguished as the first clip 30a, the second clip 30b and the third clip 30c. The second clip 30b is disposed on the inner peripheral side with respect to the first clip 30a. The third clip 30c is disposed on the inner peripheral side with respect to the second clip 30b.

More specifically, a plurality of first clips 30a are provided at an interval from each other along a circumferential path centered on the rotation axis X. The first clips 30a connect coil wires 16 that are located toward the outer periphery, among the plurality of coil wires 16. A plurality of second clips 30b are provided at an interval from each other along a circumferential path centered on the rotation axis X. The diameter of the circumferential path along which the plurality of second clips 30b are lined up is smaller than the diameter of the circumferential path along which the plurality of first clips 30a are lined up. The second clips 30b connect coil wires 16 that are located toward the middle in the inward-outward direction, among the plurality of coil wires 16. The plurality of third clips 30c are provided at an interval from each other along a circumferential path centered on the rotation axis X. The diameter of the circumferential path along which the plurality of third clips 30c are lined up is smaller than the diameter of the circumferential path along which the plurality of second clips 30b are lined up. The third clips 30c connect coil wires 16 that are located toward the inner periphery, among the plurality of coil wires 16.

The first clips 30a and the second clips 30b are located at different positions in the circumferential direction of the stator core 14. Thus, even if the two connection end portions 17 that are held in a connected state by the first clips 30a and the two connection end portions 17 that are held in a connected state by the second clips 30b protrude in the radial direction by an amount corresponding to the elastic pieces 32, the connection end portions 17 can be disposed close together in the radial direction while avoiding contact between the elastic pieces 32.

Similarly, the second clips 30b and the third clips 30c are located at different positions in the circumferential direction of the stator core 14. Thus, the two connection end portions 17 that are held in a connected state by the second clips 30b and the two connection end portions 17 that are held in a connected state by the third clips 30c can also be disposed close together in the radial direction.

Also, the third clips 30c are located at the same position to the first clips 30a and at a different position to the second clips 30b in the circumferential direction of the stator core 14. Thus, the first clips 30a, the second clips 30b and the third clips 30c need not all be shifted in the circumferential direction of the stator core 14 with respect to each other. Thus, the first clips 30a, the second clips 30b and the third clips 30c can also be disposed close together in the circumferential direction.

Figure 5:
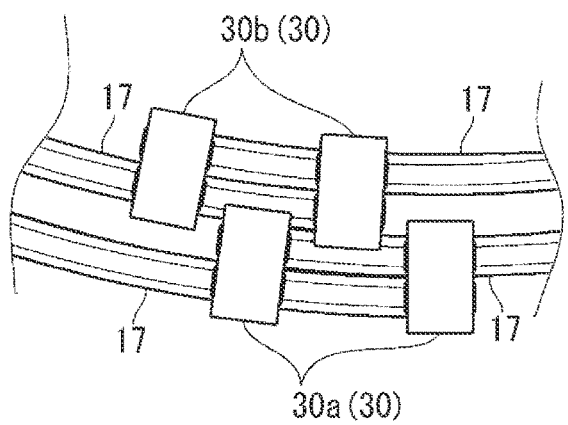
FIG. 5 is a plan view showing a disposition example of clips according to a first modification.

Note that, unlike the above example using the first clips 30a, the second clips 30b and the third clips 30c, the connection end portions 17 do not need to be kept in the connected state at positions along three circumferential paths. For example, as in a first modification shown in FIG. 5, the third clips 30c may be omitted, as shown.

Figure 6:
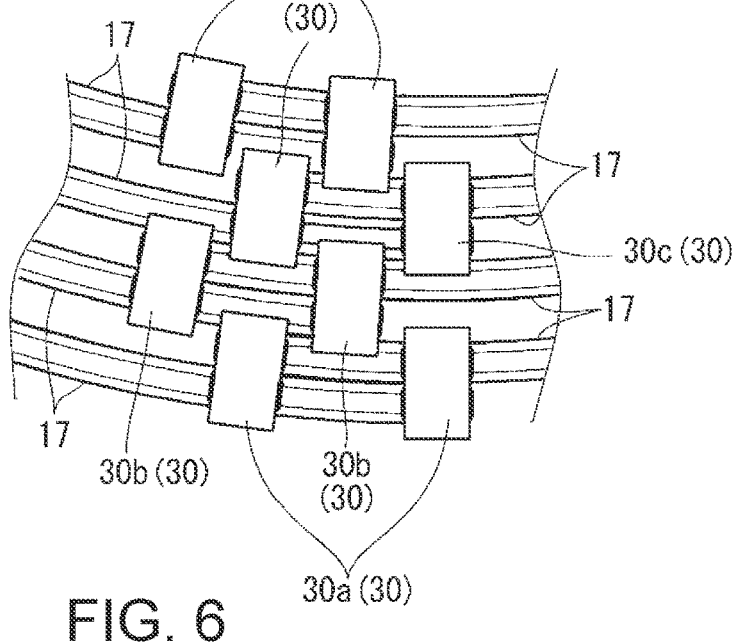
FIG. 6 is a plan view showing a disposition example of clips according to a second modification.

Also, as in a second modification shown in FIG. 6, the clips 30 may include a plurality of fourth clips 30d. The plurality of fourth clips 30d are provided at an interval from each other along a circumferential path centered on the rotation axis X. The diameter of the circumferential path along which the plurality of fourth clips 30d are lined up is smaller than the diameter of the circumferential path along which the plurality of third clips 30c are lined up. The fourth clips 30d connect coil wires 16 that are located further toward the inner periphery, among the plurality of coil wires 16.

The fourth clips 30d are located at the same position to the second clips 30b and at a different position to the third clips 30c in the circumferential direction of the stator core 14. Thus, in the circumferential direction of the stator core 14, the first clips 30a and the third clips 30c are disposed at the same position, and the second clips 30b and the fourth clips 30d are disposed at the same position, which is a position shifted from the position of the first clips 30a and the third clips 30c. Thus, a configuration can be adopted in which the first clips 30a, the second clips 30b, the third clips 30c and the fourth clips 30d are easily disposed close together in the radial and circumferential directions, in a similar manner as described above.

With the coil wire module 28 constituted in this way, if at least two connection end portions 17 are pinched together by the pair of elastic pieces 32 of a clip 30, the at least two connection end portions 17 can be kept in contact with each other. Connection between the coil wires 16 is thus facilitated.

Also, a structure is adopted in which at least two connection end portions 17 are pinched together by a clip 30, and thus, even if the at least two connection end portions 17 are positionally misaligned, the connected state can be achieved due to the pinching force of the clip 30 forcibly butting the at least two connection end portions 17 against each other. The tolerance of the connection position can thereby be absorbed by the pinching force of the clip.

Also, the clips 30 includes the first clips 30a and the second clips 30b that are disposed at different positions on the inner and outer peripheries, and are positioned at different positions in the circumferential direction of the stator core 14. Thus, the first clips 30a and the second clips 30b can be disposed as close together as possible while avoiding interference between the first clips 30a and the second clips 30b.

In the case where the clips 30 include the third clips 30c that are located further on the inner peripheral side with respect to the second clips 30b, if the third clips 30c are located at the same position to the first clips 30a and at a different position to the second clips 30b in the circumferential direction of the stator core 14, the first clips 30a, the second clips 30b and the third clips 30c can be disposed as close together as possible while avoiding interference between the first clips 30a, the second clips 30b and the third clips 30c.

Embodiment 2

Figure 7:
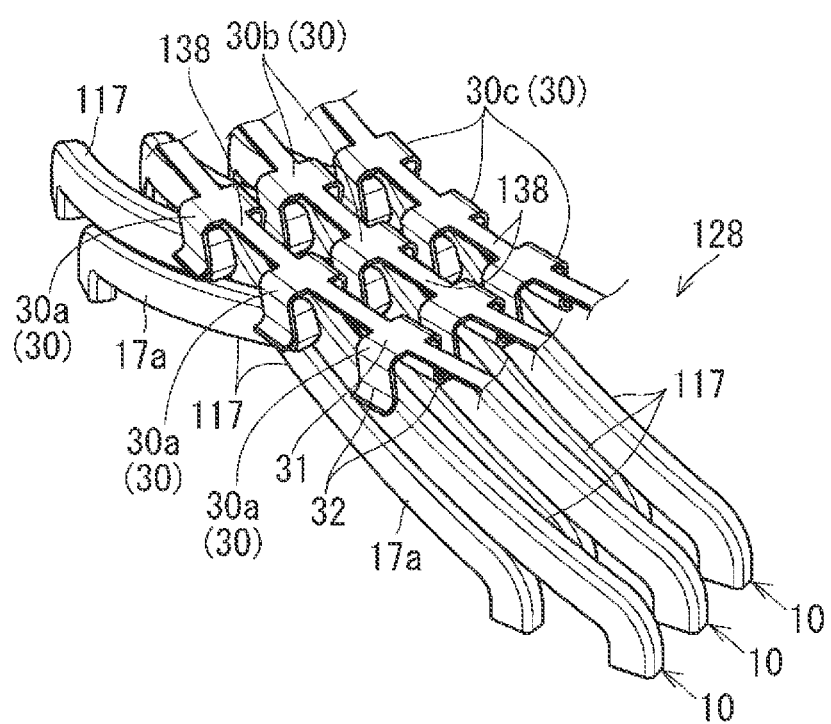
FIG. 7 is a perspective view showing connection portions between connection end portions according to Embodiment 2.

A coil wire module 128 according to Embodiment 2 will now be described. FIG. 7 is a perspective view showing connection portions between two connection end portions 117 (connection ends). FIG. 7 selectively depicts some of the connection portions. Note that, in the description of Embodiment 2, the same constituent elements as those described in Embodiment 1 are given the same reference numerals and description thereof is omitted, and the following description will focus on the differences from Embodiment 1.

The connection end portions 117 are portions corresponding to the connection end portions 17 located at the end portions of the coil wires 16. The connection end portions 117 have the inclined portion 17a of Embodiment 1, but do not have the straight end portion 17b.

Thus, a pair of elastic pieces 32 of a clip 30 pinch together the end portions of the inclined portions 17a of the connection end portions 117 that extend in a direction not parallel to the rotation axis X.

A plurality of clips 30 that are lined up at an interval from each other in the circumferential direction of a stator core 14 are coupled together in a ring shape by a coupling portion 138 (coupler).

More specifically, a plurality of first clips 30a are lined up at an interval from each other in the circumferential direction of the stator core 14. The plurality of first clips 30a are coupled together by the coupling portion 138. Any suitable configuration for coupling the plurality of first clips 30a together may be adopted. For example, the plurality of first clips 30a and the coupling portion 138 may be manufactured as integrally linked parts, by pressing a single metal plate.

Figure 8:
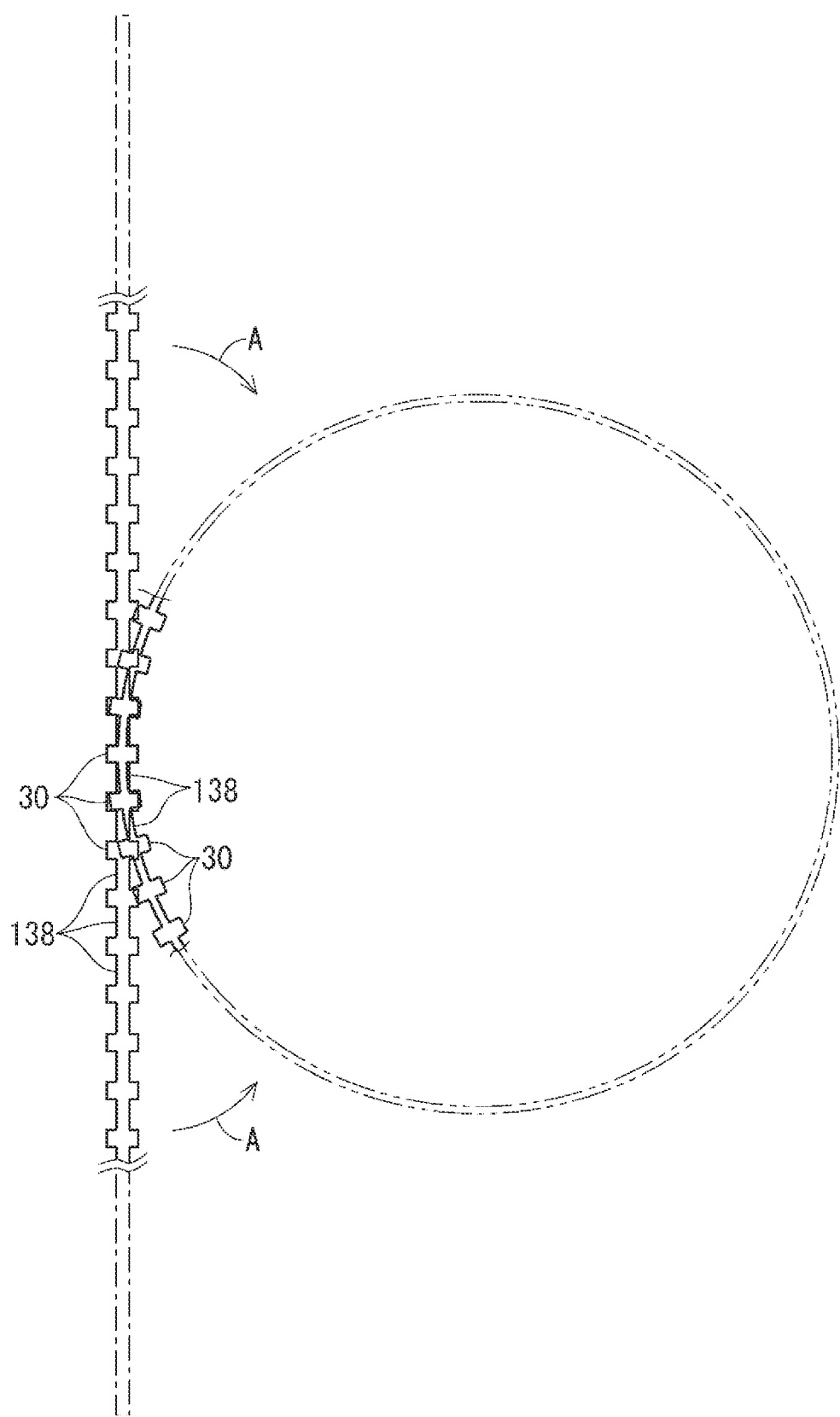
FIG. 8 is an illustrative diagram showing a manufacturing example of clips joined by a coupling portion.

In this case, as shown in FIG. 8, a single metal plate may be processed into a shape in which a plurality of first clips 30a are connected in a straight line, and, thereafter, the coupling portion 138 between the plurality of first clips 30a may be bent, as shown by arrows A, into a shape in which the plurality of first clips 30a are connected in a ring shape. In this case, the coupling portion 138 is initially pressed straight, and thereafter processed into a bent state. Marks such as wrinkles and internal warping caused by the bending process may thus conceivably remain in the coupling portion 138.

It is not essential for the coupling portion 138 to be manufactured as described above. For example, a plurality of first clips 30a may be pressed from a single metal plate so as to be disposed at an interval from each other in the circumferential direction of the stator core 14. Also, the coupling portion 138 may be molded with resin, with the base portions 31 of the plurality of clips 30 used as insert portions. The plurality of clips 30 and the coupling portion 138 may also be molded as resin parts.

The plurality of second clips 30b are also coupled by a coupling portion 138 so as to be disposed at an interval from each other in the circumferential direction of the stator core 14, in a similar manner as described above. The plurality of third clips 30c are also coupled by a coupling portion 138 so as to be disposed at an interval from each other in the circumferential direction of the stator core 14, in a similar manner as described above.

Note that, in Embodiment 2, an example in which the plurality of first clips 30a, the plurality of second clips 30b and the plurality of third clips 30c are located at the same position in the circumferential direction of the stator core 14 is shown. Similarly to Embodiment 1, the plurality of second clips 30b may be disposed at a different position to the plurality of first clips 30a and the plurality of third clips 30c in the circumferential direction.

With the coil wire module 128 according to Embodiment 2, the plurality of clips 30a are coupled by the coupling portion 138 so as to be lined up at an interval from each other in the circumferential direction of the stator core 14. The task of connectively fitting the plurality of clips 30a coupled by the coupling portion 138 onto the plurality of sets of connection end portions 117 disposed at an interval from each other in the circumferential direction of the stator core 14 can be easily performed. Therefore, the task of connecting coil wires 16 at a large number of places with a plurality of clips 30a can be easily performed.

Also, the pair of elastic pieces 32 connect at least two connection end portions 117 extending in a direction not parallel to the rotation axis X, by pinching together the at least two inclined portions 17a. Thus, the connection end portions 117 need not be provided with a portion parallel to the rotation axis X. The length by which the coil wires 16 protrude from the stator core 14 can thereby be shortened in the rotation axis X direction, and miniaturization of the coil wire module 128 and, furthermore, miniaturization of the motor 10 can be realized.

Also, if the coupling portion 138 is formed by being bent from a straight shape, the plurality of clips 30 can be lined up in the circumferential direction of the core, by performing a pressing process or the like such that the plurality of clips 30 are linked in a straight line and thereafter bending the coupling portion 138. Processing of each clip can thereby be easily performed and yield is enhanced, as compared with the case where a pressing process in performed such that the plurality of clips are lined up in a ring shape.

Embodiment 3

Figure 9:
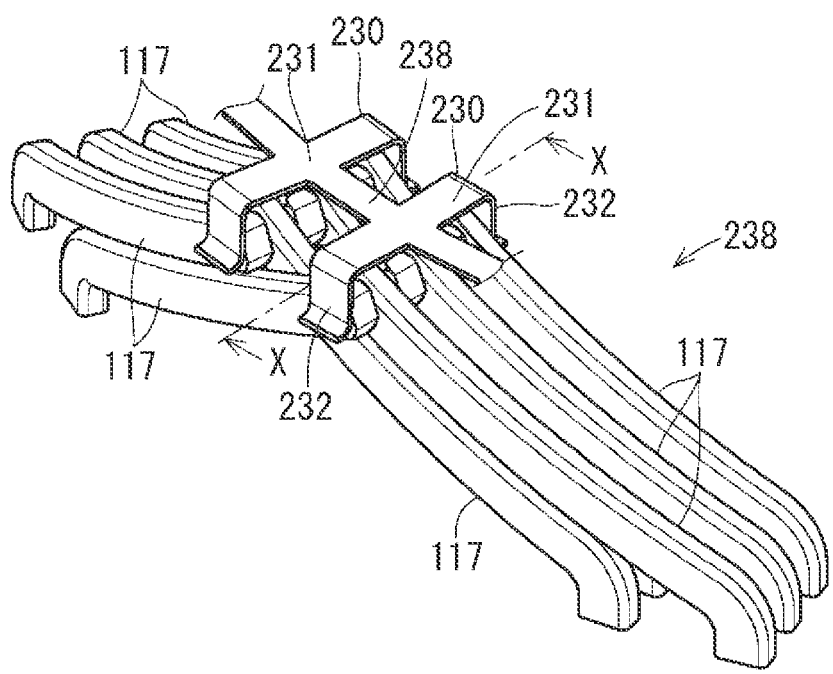
FIG. 9 is a perspective view showing connection portions between connection end portions according to Embodiment 3.
Figure 10:
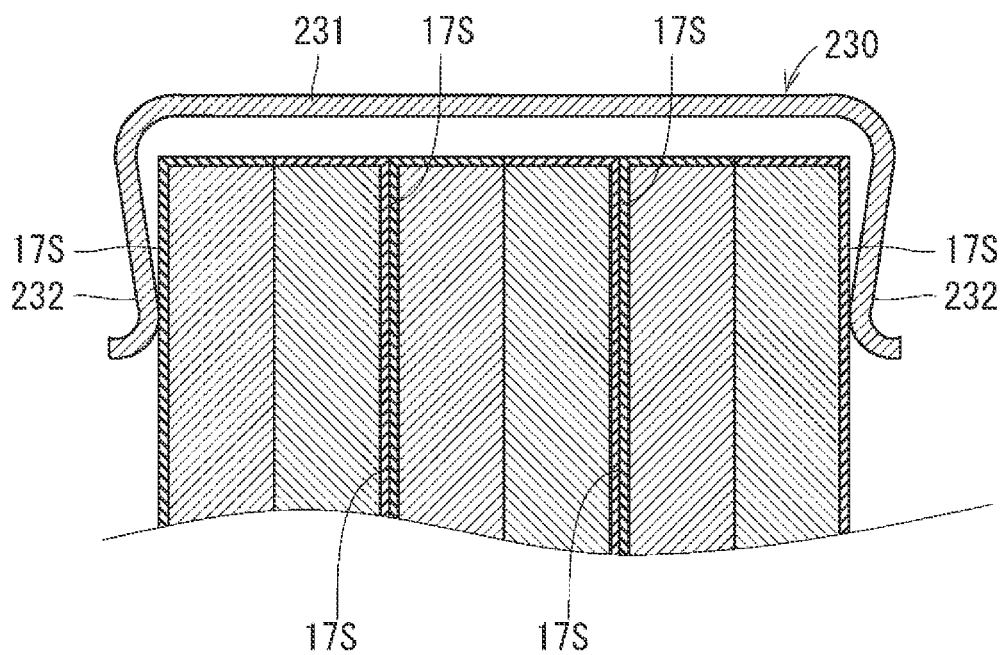
FIG. 10 is a cross-sectional view taken along line X-X in FIG. 9.

A coil wire module 228 according to Embodiment 3 will now be described. FIG. 9 is a perspective view showing connection portions between connection end portions 117. FIG. 9 selectively depicts some of the connection portions. FIG. 10 is a cross-sectional view taken along line X-X in FIG. 9. Note that, in the description of Embodiment 3, the same constituent elements as those described in Embodiments 1 and 2 are given the same reference numerals and description thereof is omitted, and the following description will focus on the differences from Embodiment 2.

The connection end portions 117 are the same as the connection end portions 117 described in Embodiment 2. A set of two connection end portions 117 that are connected toward the outer periphery of the stator core 14, a set of two connection end portions 117 that are connected toward the middle of the stator core 14 in the inward-outward direction, and a set of two connection end portions 117 that are connected toward the inner periphery of the stator core 14, among the plurality of connection end portions 117, are disposed in the same position in the circumferential direction of the stator core 14.

A clip 230 corresponding to the clip 30 includes a pair of elastic pieces 232. The dimension between the pair of elastic pieces 232 is greater than the dimension between the pair of elastic pieces 32. Here, a base 231 is set to a width that depends on the thickness of the plurality of the sets of connection end portions 117. The dimension between the pair of elastic pieces 232 is set to a size at which the initial dimension is smaller than the thickness of the plurality of sets of connection end portions 117 and the pair of elastic pieces 232 can spread to wider than the aforementioned thickness due to elastic deformation including that of the base 231.

In a state where a plurality (here, three) of sets of two connection end portions 117 arranged side by side in the radial direction of the stator core 14, the pair of elastic pieces 232 pinch together the sets arranged side by side from the inner and outer peripheral sides. The pair of elastic pieces 232 are then biased in a direction approaching each other, by the elastic force acting to return the portion spanning from the pair of elastic pieces 232 to the base 231 to its original shape. In each of the plurality (here, three) of sets of two connection end portions 117, the two connection end portions 117 are thereby biased in a direction approaching each other and kept in contact with each other.

Note that, where electrical connection is required, the conductors of the connection end portions 117 are exposed and conduction is obtained. Also, where insulation is required between the connection end portions 117, that is, between the aforementioned sets, insulation is obtained by an insulating coating 17S that serves as an insulating member (insulation). The insulating member may be the insulating coating 17S formed on part of the outer periphery of the connection end portion 117, or may be an insulating member such as an insulating plate or an insulating film separately sandwiched between the connection end portions 117.

In Embodiment 3, a plurality of clips 230 are disposed so as to be lined up at an interval from each other in the circumferential direction of the stator core 14. The plurality of clips 230 are coupled together by a coupling portion 238 (coupler), similarly to Embodiment 2. The coupling portion 238 may be omitted.

With the coil wire module 228 of Embodiment 3, a plurality of sets of at least two connection end portions 117 are pinched together by the clip 230, thus enabling the number of clips 230 and the number times the task of pinching by the clips 230 is performed to be reduced, and simplification of structure and assembly to be achieved.

Also, the sets of at least two connection end portions 117 are insulated from each other by an insulating member such as the insulating coating 17S, thus enabling the sets of connection end portions 117 that require insulating from each other to be electrically connected individually.

Modifications

Note that the configurations described in the embodiments and the modifications can be combined as appropriate as long as there are no mutual inconsistencies.

For example, the end portions of the inclined portions 17a of Embodiment 2 may be pinched together by clips 30 that are not coupled by a coupling portion, as described in Embodiment 1. Also, the clips 30a, 30b and 30c in Embodiment 1 may be disposed at the same position in the radial direction of the stator core 14.

Also, in the above example, the case where the clips pinch together two connection end portions in an electrically connected state is described. The clips may pinch together three connection end portions in an electrically connected state. In this case, a configuration need only be adopted in which the conductors on both surfaces of the middle connection end portion are exposed, and the conductors of the surfaces on the middle connection end portion side of the two outer connection end portions are exposed.

Note that the configurations described in the embodiments and the modifications can be combined as appropriate as long as there are no mutual inconsistencies

The invention claimed is:

1. A coil wire module for a rotating electric machine, the coil wire module comprising:
  a plurality of coil wires that are configured to be provided in a core of the rotating electric machine;
  a first clip having a pair of first elastic pieces; and
  a second clip having a pair of second elastic pieces, wherein:
    each coil wire among the plurality of coil wires has a connection end that is configured to be exposed from an end of the core,
    the first clip is elastically deformable in a manner that changes a distance between the first elastic pieces and the second clip is elastically deformable in a manner that changes a distance between the second elastic pieces,
    in a state where the pair of first elastic pieces pinch together at least two first connection ends among the connection ends of the plurality of coil wires, the at least two first connection ends are kept in contact with each other by an elastic force of the first clip, and in a state where the pair of second elastic pieces pinch together at least two second connection ends among the connection ends of the plurality of coil wires, the at least two second connection ends are kept in contact with each other by an elastic force of the second clip,
    the second clip is located on an inner peripheral side of the coil wire module with respect to the first clip, and
    the first clip and the second clip are located at different positions in a circumferential direction of the core.

2. The coil wire module according to claim 1, further comprising:
  a third clip located on an inner peripheral side with respect to the second clip,
  wherein the third clip is located at a same position to the first clip in the circumferential direction of the core and at a different position to the second clip in the circumferential direction of the core.

3. The coil wire module according to claim 1,
  wherein the first elastic pieces pinch together a plurality of sets of the at least two first connection ends.

4. The coil wire module according to claim 3, further comprising:
  an insulation that insulates the plurality of sets of the at least two first connection ends from each other.

5. The coil wire module according to claim 1, wherein:
  the first connection ends and the second connection ends each extend in a direction not parallel to a rotation axis of the rotating electric machine, and
  the first elastic pieces pinch together end portions of the first connection ends, the end portions of the first connection ends extending in same directions as the first connection ends, and the second elastic pieces pinch together end portions of the second connection ends, the end portions of the second connection ends extending in same directions as the second connection ends.

6. The coil wire module according to claim 1,
  further comprising a coupler that couples the first clip and the second clip together, such that the first clip and the second clip are lined up at an interval from each other in a circumferential direction of the core.

7. The coil wire module according to claim 6,
  wherein all parts of the coupler have a uniform thickness.

8. A coil wire module for a rotating electric machine, the coil wire module comprising:
  a plurality of coil wires that are configured to be provided in a core of the rotating electric machine;
  a first clip having a pair of first elastic pieces;
  a second clip having a pair of second elastic pieces; and
  a coupler that couples the first clip and the second clip together, such that the first clip and the second clip are lined up at an interval from each other in a circumferential direction of the core, wherein:
    each coil wire among the plurality of coil wires has a connection end that is configured to be exposed from an end of the core,
    the first clip is elastically deformable in a manner that changes a distance between the first elastic pieces and the second clip is elastically deformable in a manner that changes a distance between the second elastic pieces, and
    in a state where the pair of first elastic pieces pinch together at least two first connection ends among the connection ends of the plurality of coil wires, the at least two first connection ends are kept in contact with each other by an elastic force of the first clip, and in a state where the pair of second elastic pieces pinch together at least two second connection ends among the connection ends of the plurality of coil wires, the at least two second connection ends are kept in contact with each other by an elastic force of the second clip.

9. The coil wire module according to claim 8,
  wherein all parts of the coupler have a uniform thickness.

* * * * *